United States Patent [19]

Buswell et al.

[11] 4,098,589
[45] Jul. 4, 1978

[54] CATALYTIC REACTION APPARATUS

[75] Inventors: Richard F. Buswell, Glastonbury; Richard A. Sederquist, Newington; Daniel J. Snopkowski, Wethersfield, all of Conn.

[73] Assignee: United Technologies Corporation, Hartford, Conn.

[21] Appl. No.: 827,804

[22] Filed: Aug. 25, 1977

Related U.S. Application Data

[63] Continuation-in-part of Ser. No. 753,348, Dec. 22, 1976, abandoned.

[51] Int. Cl.² .............................. B01J 7/00; B01J 8/06
[52] U.S. Cl. ..................................... 48/94; 23/277 R; 23/288 M; 165/155
[58] Field of Search ............... 48/93, 94, 95, 105, 48/146 A, 214 A; 252/373; 423/651, 652, 653, 654; 23/288 R, 288 M, 288 K, 288 H, 277 R, 289; 165/154, 155, 142, 171; 122/367 PF

[56] References Cited

U.S. PATENT DOCUMENTS

| 2,066,348 | 1/1937 | Hays | 122/367 PF |
|---|---|---|---|
| 3,476,519 | 11/1969 | Decaux | 23/288 M |
| 3,541,729 | 11/1970 | Dantowitz | 48/94 |
| 3,645,701 | 2/1972 | Banchik et al. | 48/196 A |
| 3,909,299 | 9/1975 | Corrigan | 48/94 |

Primary Examiner—S. Leon Bashore
Assistant Examiner—Peter F. Kratz
Attorney, Agent, or Firm—Stephen E. Revis

[57] ABSTRACT

A catalytic reaction apparatus, such as for steam reforming a hydrocarbon feedstock to produce hydrogen, includes a tubular reactor disposed within a furnace. The reactor includes an annular reaction chamber which is heated along its outer wall by a countercurrent flow of furnace gases traveling through a narrow annulus external thereof. The reaction chamber is also heated along its inner wall by regenerative heat from the reaction products which leave the annular chamber and flow countercurrent to the flow within the reaction chamber through a narrow annulus disposed along the inner wall thereof. This apparatus is capable of high reactor thermal efficiency over a wide range of heating rates, including very high heating rates. The apparatus is very compact and is particularly suited for use with a large number of closely packed tubular reactors disposed within a single furnace.

13 Claims, 2 Drawing Figures

CATALYTIC REACTION APPARATUS

This application is a continuation-in-part of copending application Ser. No. 753,348, filed Dec. 22, 1976 now abandoned.

BACKGROUND OF THE INVENTION

1. Field of the Invention

This invention relates to catalytic reaction apparatus such as for producing product gases from a feedstock.

2. Description of the Prior Art

Catalytic reaction apparatus for converting hydrocarbon fuels to useful industrial gases, such as hydrogen, are well known in the art. They are generally designed for high product gas yield. Equipment size has been generally of secondary importance since the cost to produce the product gas is a small fraction of the price of the products made from the product gas. The most common process for producing hydrogen is steam reforming a hydrocarbon fuel by passing it through heated catalyst filled reaction tubes disposed within a furnace. Typically the reaction tubes are 20–40 feet long and the primary mode (on the order of 70%) of heat transfer is by radiation from the furnace walls to the reaction tubes. This requires relatively large spacing between the tubes and placement of the tubes adjacent the walls of the furnace in order that each tube is uniformly heated by radiation from the walls. These commercial hydrogen generation plants have a very high rate of heat transfer, on the order of 20,000–25,000 Btu/hr per ft$^2$ of reaction tube surface area; however, because this type of system is primarily dependent upon radiant heat, reactor thermal efficiency is only 40–60%. Although high hydrogen conversion rates can be achieved, a large percent of the heat energy produced in the furnace leaves the furnace in the form of high temperature exhaust gases (i.e., waste heat). Thus, in order to have high heating rates large amounts of fuel are burned. If the heat energy is not used in a separate process, such as to produce steam, it would have to be thrown away. Even if the waste heat is used, it is not being used to produce hydrogen, thereby reducing reactor thermal efficiency and increasing the cost of the hydrogen being produced.

Along with the development of the fuel cell power plant came the need for low cost hydrogen as fuel as well as the need for low equipment cost in order for the fuel cell power plant to compete economically with existing electricity generating equipment. These needs brought additional incentive into the marketplace to reduce the size and the operating cost of fuel processing apparatus for the generation of hydrogen from hydrocarbon fuels. Mertens U.S. Pat. No. 3,144,312 and Dantowitz, U.S. Pat. No. 3,541,729, both attempt to reduce the size of reaction apparatus while also increasing thermal efficiency. The extent to which they succeed, if they succeed at all, cannot readily be determined; however, hereinafter in the specification Applicant will point out the shortcomings of these designs as compared to Applicant's invention.

Corrigan U.S. Pat. No. 3,909,299, of common assignee with the present invention, shows a steam reforming reactor design having some desirable features, but it too is not as efficient nor can it be as compact as Applicant's invention hereinafter described.

SUMMARY OF THE INVENTION

Accordingly, an object of the present invention is catalytic reaction apparatus having the capability of operating at high reactor thermal efficiencies.

A further object of the present invention is catalytic reaction apparatus which is compact.

Another object of the present invention is catalytic reaction apparatus which simultaneously is compact, has high reactor thermal efficiencies, and is capable of operating at high heating rates.

The catalytic reaction apparatus of the present invention comprises an annular reaction chamber disposed within a furnace wherein heat for the reaction is provided by 1) hot furnace gas flowing countercurrent to the flow through the reaction chamber within a narrow annulus coaxial with and adjacent the external wall surface of the annular reaction chamber and 2) regenerative heat from the reaction products leaving the reaction chamber and flowing countercurrent to the flow through the reaction chamber within a narrow annulus coaxial with and adjacent the internal wall of the reaction chamber, the annulus carrying the reaction products being substantially isolated from the heating effects of the hot gases within the furnace. The present invention is particularly suited to packaging a large number of reactors within a compact furnace volume.

To achieve low cost high heating rates (i.e., the rate at which heat is being transferred from the hot gases in the furnace into the reaction stream per unit of wall surface area separating the two streams) and compact packaging is required. High reactor thermal efficiency requires a high rate of conversion of process fuel into hydrogen while burning a minimum amount of fuel in the furnace. Elaborate and expensive structural arrangements for the purpose of avoiding excessive thermal stresses created by temperature differences between joined parts should not be required.

All of the foregoing may be accomplished by the present invention in which two streams are used to heat the reaction stream. The main source of heat is from the countercurrent flow of furnace gases through a narrow annulus along the outer wall of an annular reaction chamber; the other source of heat is regenerative heat from the reaction products which leave the annular reaction chamber and flow countercurrent through a narrow annulus along the inner wall thereof. The use of countercurrent flows and narrow annular heating gas passageways are critical to being able to maximize the heating rate and reactor thermal efficiency. A high regenerator heat transfer effectiveness reduces the required furnace heat duty per unit of process fuel flow. Therefore, more fuel can be processed for the same amount of fuel used in the furnace (i.e., the apparatus operates at a higher overall thermal efficiency). In this regard, the annular gap size of each of the two annular passageways carrying hot gases in heat exchange relationship to the reaction chamber is critical in determining how much of the available heat in the heating streams is actually transferred to the reaction stream.

In discussing the invention it is useful to consider the parameter called heat transfer effectiveness ($\epsilon$). The heat transfer effectiveness is equal to the change in enthalpy of the heating stream divided by the theoretical maximum change in enthalpy. In other words, if the heating stream has an enthalpy of $E_1$ at its inlet temperature of $T_1$ and an enthalpy of $E_2$ at its exit temperature of $T_2$, and if the heated stream has a temperature of $T_3$ at its inlet, then the heat transfer effectiveness as between the two streams is given by the following equation:

$$\epsilon = \frac{E_1 - E_2}{E_1 - E_3}$$

where $E_3$ is the enthalpy of the heating stream calculated at the temperature $T_3$.

It is also important to define reactor thermal efficiency ($\eta$):

$$\eta = \frac{(N_{H_2}) \cdot (LHV_{H_2})}{(F_r)(LHV_r) + F_f(LHV_f)}$$

where $N_{H_2}$ is the net amount of hydrogen produced, $LHV_{H_2}$ is the lower heating value of hydrogen, $F_r$ is the amount of process fuel fed to the reactor, $F_f$ is the amount of fuel fed to the furnace, and $LHV_r$ and $LHV_f$ are the lower heating values of the process and furnace fuel, respectively. The foregoing assumes hydrogen is the desired reaction product. The equation can readily be modified for other reaction products.

It is helpful to keep in mind that $\eta$ is approximately directly proportional to $\epsilon$; therefore, high efficiency requires high heat transfer effectiveness.

The advantage of reaction apparatus designed according to the present invention is mainly that it is capable of high reactor thermal efficiency over a wide range of heating rates (including very high heating rates) while the size of the apparatus is compact. The result is a long lived, compact, economical, efficient design capable of handling high process fuel throughputs.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENTS

Figure 1:
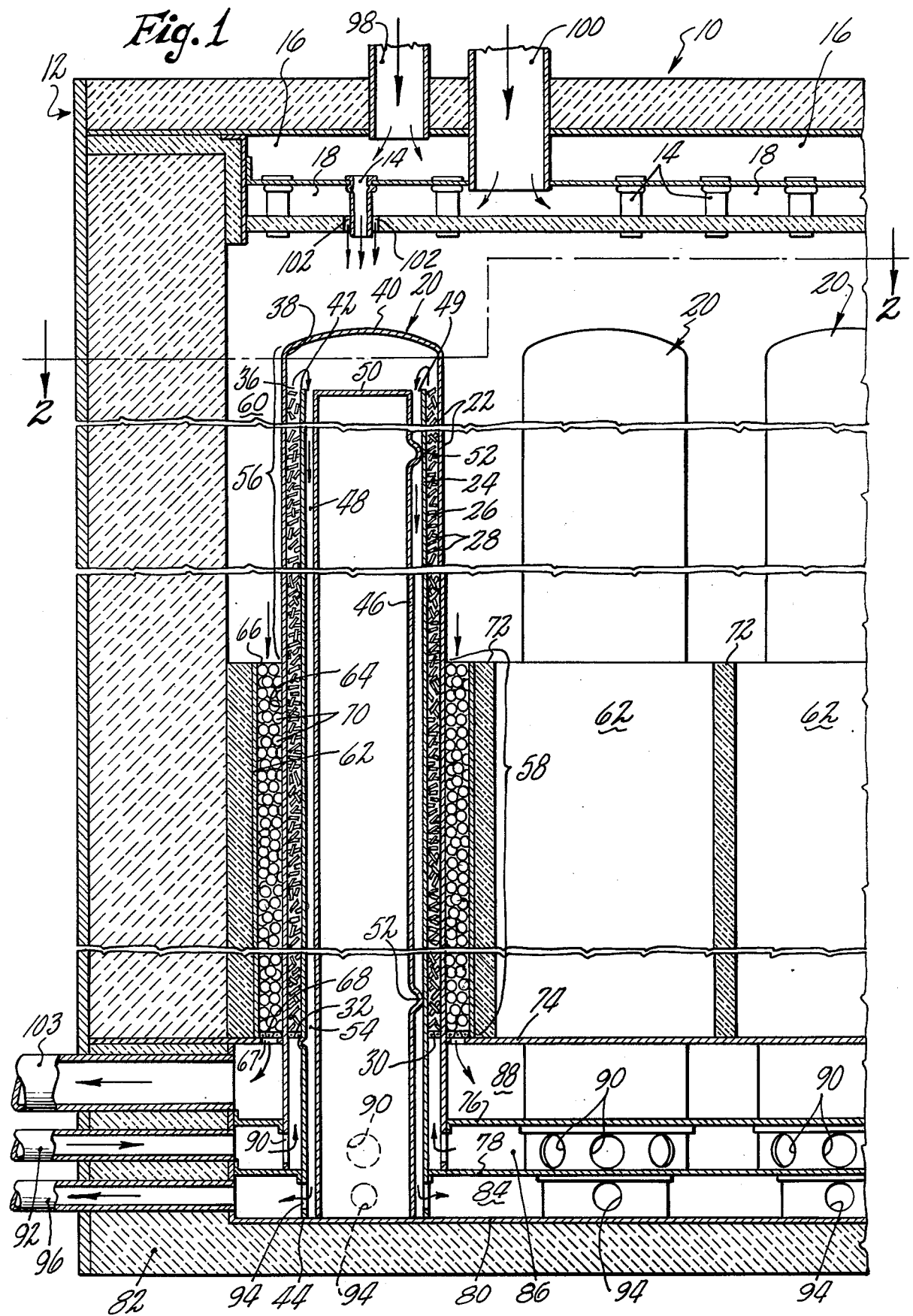
FIG. 1 is a fragmentary, vertical, cross-sectional view of catalytic reaction apparatus according to the present invention.
Figure 2:
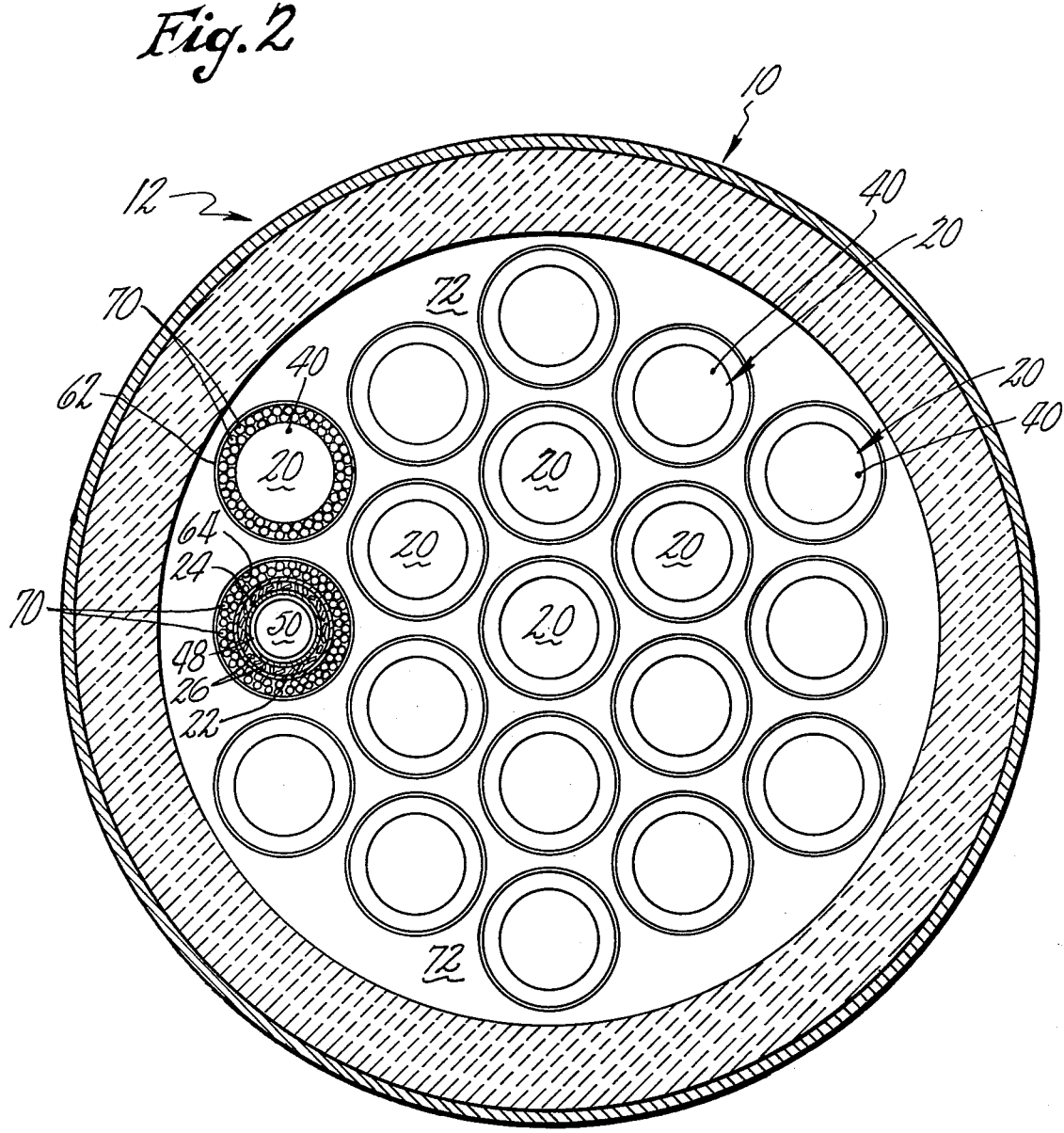
FIG. 2 is a cross-sectional view of the apparatus of FIG. 1 taken substantially along the line 2—2 of FIG. 1.

Consider, as an exemplary embodiment of the present invention, the catalytic reaction apparatus 10 of FIGS. 1 and 2. In this embodiment, the apparatus is for the purpose of steam reforming a reformable hydrocarbon fuel in the presence of a suitable catalyst in order to produce hydrogen. The apparatus 10 comprises a furnace 12 including burner nozzles 14, a burner fuel manifold 16, and an air manifold 18. Disposed within the furnace 12 is a plurality of closely packed tubular reactors 20.

Each reactor 20 comprises an outer cylindrical wall 22 and an inner cylindrical wall or center tube 24 defining an annular reaction chamber 26 therebetween. The reaction chamber 26 is filled with steam reforming catalyst pellets 28 which are supported on a screen 30 disposed at the inlet 32 of the reaction chamber. Any suitable steam reforming catalyst, such as nickel, may be used to fill the reaction chamber from its inlet 32 to its outlet 36. The cylinder which is defined by the outer wall 22 is closed at its upper end 38 by an end cap 40. The center tube 24 has an upper inlet end 42 and a lower outlet end 44. The inlet end 42 terminates below the end cap 40 such that the center tube is in gas communication with the outlet 36 of the reaction chamber 26.

Disposed within the center tube is a cylindrical plug 46 which has an outer diameter somewhat smaller than the inner diameter of the center tube thereby defining an annular regeneration chamber 48 therebetween having an inlet 49. The plug 46 may be a solid rod, but in this embodiment is a tube which is blocked by an end cap 50 at one end thereof such that reaction products exiting the reaction chamber 26 must flow around the plug 46 through the regeneration chamber 48. Spacing between the plug 46 and the center tube 24 is maintained by dimples 52 in the plug wall.

For the purposes of the present invention, the function of the regeneration chamber 48 is to return heat from the reaction products leaving the outlet 36 back into the catalyst bed of the reaction chamber 26; therefore, with regard to the present invention, the outlet 54 of the regeneration chamber 48 is considered to be located adjacent the inlet 32 of the catalyst bed rather than at the outlet end 44 of the center tube, despite the fact that the actual annulus defined between the plug 46 and the center tube 24 extends to the outlet end 44. The arrangement shown in FIG. 1 provides some preheating of the process fuel before it enters the catalyst bed, but this is not critical to the present invention. Also, in this embodiment the plug 46 extends the entire length of the reaction chamber such that the inlet 49 of the regeneration chamber is adjacent the outlet 36 of the reaction chamber; although this is preferred for maximum regeneration, the regeneration chamber inlet may be located anywhere between the inlet and outlet of the reaction chamber by using a shorter plug.

Note that the regeneration chamber 48 is substantially isolated from the hot furnace gases. For maximum overall reactor efficiency it is important to prevent the heat energy of the furnace gas from heating the reaction products within the regeneration chamber. It is also important to avoid the burning of additional fuel or hydrogen within the regeneration chamber. Only sensible heat already in the reaction products at the outlet 36 is transferred to the reaction chamber.

Each reactor 20 may be considered to comprise an upper portion 56 and a lower portion 58. The upper portion 56 is disposed within what is hereinafter referred to as the burner cavity 60. The cavity 60 is that volume of the furnace 12 within which actual combustion of the fuel and air fed into the furnace takes place. This volume is characterized by very high temperatures, considerable radiant heating as well as convective heating of the reactors 20, and axial (i.e., in the direction of the axis of the reactors 20) as well as radial mixing of the gases therein.

The lower portion 58 of each reactor is surrounded by a cylindrical wall or conduit 62 spaced outwardly from the wall 22 defining an annular burner gas passageway 64 therebetween having an inlet 66 and an outlet 67. The outlet 67 is adjacent the inlet 32 of the reaction chamber 26. The passageway 64 is filled with a heat transfer packing material such as spheres 70 of alumina supported on a screen 68. The space 72 between adjacent conduits 62 is filled with a nonheat conductive material such as ceramic fiber insulation which is supported on a plate 74 extending across the furnace and which has holes therein through which the reactors 20 pass. The plate 74 and the material within the space 72 prevents the furnace gases from flowing around the outside of the conduits 62.

In addition to the plate 74, plates 76, 78, and 80 also extend across the furnace and define manifolds therebetween. The plate 80 rests on the bottom wall 82 of the furnace. The plates 78 and 80 define a reaction products manifold 84 therebetween; the plates 76 and 78 define a process fuel inlet manifold 86 therebetween; and, the plates 74 and 76 define a furnace gas outlet manifold 88 therebetween. The plugs 46 and the center tubes 24 abut the bottom plate 80; the outer walls 22 of the reactors abut the plate 78; and, the conduits 62 abut the plate 74.

In operation, a mixture of steam and reformable hydrocarbon fuel from the manifold 86 enters the inlet 32 of the reaction chamber 26 by way of the holes 90 in the wall 22; the manifold 86 is fed by a conduit 92. The mixture immediately begins to be heated by the furnace gases flowing countercurrent thereto through the passageway 64 and begins to react in the presence of the catalyst particles 28. As the fuel, steam, and reaction products travel upward within the reaction chamber 26 they continue to react and pick up additional heat. At the outlet 36 the temperature of the reaction products reaches a maximum. The hot reaction products enter the inlet 49 of the regeneration chamber 48. As the reaction products traverse the length of the annular regeneration chamber, heat is transferred therefrom back into the reaction chamber 26. They thereupon enter the reaction products manifold 84 through the holes 94 in the center tube 24, and are carried away from the reactor via the conduit 96 either for further processing, storage, or consumption.

Fuel for the furnace enters the manifold 16 via a conduit 98 and thereupon passes into the burner cavity 60 by way of the nozzles 14. Air enters the manifold 18 via a conduit 100 and enters the burner cavity 60 via annular passageways 102 surrounding each nozzle 14. Burning of the fuel and air takes place within the burner cavity 60. The hot gases from the burner cavity travel through the passageways 64 into the manifold 88 and are exhausted via the conduit 103. Within the burner cavity temperatures are generally sufficiently high that high heating rates are obtained over the upper portions 56 of the reaction chambers despite the relatively low heat transfer coefficient in that area. As the furnace gases drop in temperature while moving further away from the burner nozzles the heating rate would normally become unacceptably low; however, this is counteracted by the present invention by the use of the annular burner gas passageways 64 over the lower portions 58 of the reactors. These passageways, when properly sized, increase the local heat transfer coefficient and thus the heat transfer effectiveness levels. This results in high heating rates over both the upper and lower portions despite the lower temperatures of the furnace gases over the lower portions.

Of primary importance to achieving high heating rates is the annular gap size of the burner gas passageway, the reaction chamber, and the regeneration chamber. According to the present invention, these gaps are sized to provide the highest possible heat transfer effectiveness consistent with the desired exhaust temperatures of the furnace gases and reaction products. Although, theoretically, the heat transfer effectiveness increases with narrowing burner gas passageway and narrowing regeneration chamber gap size, practical limitations such as maximum tolerable wall temperatures and pressure drops within the annuli will be important factors in determining minimum permissible gap sizes for a particular application. The reaction chamber annular gap size is selected, in combination with gap sizes of the burner gas passageway and regeneration chamber, to provide sufficiently high temperatures across the entire catalyst bed without having the furnace gases in the burner gas passageway heat the reaction products within the regeneration chamber on the other side of the bed. In other words, as previously mentioned, the regeneration chamber must be substantially isolated from the heating effects of the furnace gases.

At this point it is interesting to compare the present invention with the apparatus shown in the aforementioned Dantowitz U.S. Pat. No. 3,541,729 and Mertens U.S. Pat. No. 3,144,312. In Dantowitz the furnace heating stream flows in the same direction as the flow through the annular catalyst bed along the inner wall thereof. This approach is clearly less efficient and different from the countercurrent flow of the present invention along the outer wall of the bed. Further with regard to Dantowitz is that the highest furnace gas temperatures are adjacent the inlet end of the catalyst bed which is the coolest end; heat transfer in this area is likely to be so great that a substantial amount of heat from the furnace gases will be transferred to the upper portions of the regeneration stream in the annulus 113. This heat leaves the furnace with the reaction products, thereby reducing the overall reactor thermal efficiency. This does not occur in the present invention because the burner gas is coldest at the reaction chamber inlet as a result of countercurrent flow.

Mertens is distinguished from the present invention in that the furnace gases are adjacent the inner annular catalyst bed. Also, the furnace gases flow adjacent both the inner and outer reaction streams which is contrary to the present invention whereby the regeneration stream is substantially isolated from the hot furnace gases, an important requirement of the present invention. Also, note that the relatively cool cylindrical outer wall 10 is rigidly attached to the relatively hot inner cylindrical wall 9. Stresses caused by differential thermal growth between these two walls is likely to be unacceptably high and could cause failure. Furthermore, neither the apparatus of Mertens or Dantowitz is suitable for use with a plurality of reactors in a single furnace.

Returning now to the present invention, it has been determined that a relatively narrow range of gap sizes yields good reactor thermal efficiencies at high as well as low process fuel throughputs. The heat transfer packing material 70 disposed within the passageways 64 further enhances heat transfer effectiveness and uniformity of heat distribution as compared to an annulus of the same size but without heat transfer packing material. Since heat transfer effectiveness increases with decreasing annular gap size, the heat transfer packing material 70 of the present embodiment could be dispensed with if the annular burner gas passageway size were reduced. This is contemplated as being within the scope of the present invention; however, a larger annular passageway with heat transfer packing material is preferred since it is more difficult and more expensive to maintain acceptable dimensional tolerances as the gap becomes smaller. Acceptable ranges for gap sizes with and without heat transfer packing are given in Table 1; best results are obtained using the preferred ranges given in Table 2. The ranges given are educated estimates based in large part on test results. It should be kept in mind that for very small or very large diameter reactors the ranges given may be extended.

TABLE 1

ACCEPTABLE ANNULAR GAP SIZES

| | |
|---|---|
| Reaction chamber | 0.3 – 2.0 inch |
| Regeneration chamber | 0.1 – 1.0 inch |
| Burner gas passageway (without packing) | 0.1 – 1.0 inch |
| Burner gas passageway (with packing) | 0.5 – 3.0 inch |

TABLE 2

PREFERRED ANNULAR GAP SIZES

| | |
|---|---|
| Reaction chamber | 0.5 – 1.5 inch |
| Regeneration chamber | 0.125 – 0.5 inch |
| Burner gas passageway (without packing) | 0.25 – 0.5 inch |
| Burner gas passageway (with packing) | 0.5 – 2.0 inch |

Some other factors which will determine the selection of gap size are: properties of the gases and catalyst particles, the thickness and thermal conductivity of the walls separating the heating and heated gas, and the Reynolds number of the various streams. With regard to the walls separating the countercurrent flows, they are usually made as thin as possible consistent with structural integrity, and from materials which are not extremely expensive but which have good thermal conductivity. Catalyst is generally selected for good reactivity and long life. Catalyst particle size is generally chosen to be as small as possible in order to maximize catalyst surface area, but not so small as to create an unacceptable pressure drop through the reaction chamber.

Although not shown in any of the figures, means should be provided to prevent fluidization of the catalyst bed as a result of the upward flowing process gas. For example, the anti-fluidization means described in commonly owned, copending U.S. Pat. application Ser. No. 753,336 titled "Upflow Catalytic Reaction Apparatus With Anti-fluidization Means" by R. Masters, R. Sederquist, and D. Szydlowski filed on Dec. 22, 1976 could be used, and is incorporated herein by reference.

EXAMPLE I

In a 19 tube steam reforming reaction apparatus similar to that shown in FIGS. 1 and 2, each reactor was about 60 inches long measured from the inlet 32 and had an outer wall diameter of 9.0 inches. Half the length (30 inches) of the reactor extended into the burner cavity. 3 inches separated the outer walls 22 of adjacent reactors; reactors adjacent the furnace wall were spaced between 4 and 5 inches therefrom. The gap between the outer wall 22 and inner wall 24 was 1.1 inches; between the inner wall 24 and plug 46, 0.25 inch; and between the conduit 62 and the outer wall 22, 1.25 inches. The burner gas passageway was filled with 0.5 inch diameter raschig rings of alumina; the catalyst was in the form of cylindrical pellets. The process fuel was naphtha which entered the catalyst bed as a vapor mixed with about 4.5 parts steam by weight. The rate of process fuel flow was about 25 lb/hr per reactor for a total fuel flow rate of about 475 lb/hr. A conversion rate of 95% and an overall reactor thermal efficiency of 90% was achieved.

EXAMPLE II

In a single tube steam reforming reaction apparatus according to the present invention, the reactor was 60 inches long measured from the inlet 32 and had an outer wall diameter of 9.0 inches. Half the length (30 inches) of the reactor extended into the burner cavity. The furnace wall was spaced three inches from the reactor outer wall, all around. The gap between the outer wall 22 and the inner wall 24 was 1.1 inches; between the inner wall 24 and plug 46, 0.25 inch; and between the conduit 62 and the outer wall 22, 1.25 inches. The burner gas passageway was filled with 0.5 inch alumina spheres; the catalyst was in the form of cylindrical pellets. The process fuel was naphtha which entered the bed as a vapor mixed with about 4.5 parts steam by weight. The rate of process fuel flow was 61 lb/hr. A conversion rate of 88% and an overall reactor thermal efficiency of 87% was achieved.

It should be apparent that the manifolding arrangement and burner construction shown in the drawing are by way of example only and are not critical to or a part of the present invention, the invention being applicable to a single reactor within a furnace as well as many reactors as is apparent from the foregoing examples. However, the present invention is particularly advantageous when a plurality of reactors are disposed in a single furnace since it permits close packing of the reactors by assuring both uniform and highly efficient heating of the lower portions of the reactors.

Closely packed reactors or reactor tubes, as that phrase is used herein and in the claims, means a non-linear array of at least three reactors wherein the array substantially fills the burner cavity volume and the reactors are substantially uniformly distributed and substantially uniformly spaced within said burner cavity volume and are closely spaced from each other. As examples, assuming a cylindrical burner cavity, a closely packed three reactor array may be in the shape of an equilateral triangle with one reactor at each vertex; a closely packed four reactor array may be in the shape of a square with a reactor at each corner; a five tube array may comprise a central reactor surrounded by a square array of four reactors. Nine reactors might be arranged in a square array of three parallel rows of three reactors each. A nineteen reactor hexagonal type array is shown in FIG. 2. In all cases at least a portion of each reactor in the array receives a substantially reduced amount of direct radiation from the burner cavity wall. For example, reactors adjacent the wall receive substantially reduced radiation on the side opposite the wall; also, portions of reactors receive a substantially reduced amount of radiation as a result of blockage of the radiation by other reactors in the array.

It should also be apparent that the invention is not limited to steam reforming hydrocarbon fuels to produce hydrogen. The heat transfer concepts upon which the invention is based could apply equally well to other endothermic catalytic reactions.

The teachings of several other commonly owned, copending U.S. patent applications, filed on Dec. 22, 1976 may also be incorporated into the apparatus of the present invention if desired. These applications are: U.S. Ser. No. 753,341 "Improved Steam Reforming Process and Apparatus Therefor" by R. Sederquist now U.S. Pat. No. 4,071,330 and U.S. Ser. No. 753,335 "Compact Multitube Catalytic Reaction Apparatus" by G. Krar, O. Olesen, R. Sederquist, and D. Szydlowski now abandoned.

Another commonly owned, copending U.S. patent application not heretofore mentioned and having subject matter related to the present invention is U.S. Ser. No. 753,334 "Multi-tube Catalytic Reaction Apparatus" by R. Buswell, R. Sederquist, and D. Snopkowski, also filed on Dec. 22, 1976 now abandoned.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. Catalytic reaction apparatus comprising:
    means defining a burner cavity for burning fuel therein to produce hot gases;
    at least one tubular reactor, said reactor including a first portion extending into said burner cavity and a second portion disposed outside said burner cavity, said reactor having an outer wall and an inner wall, said inner wall spaced from said outer wall defining an annular reaction chamber therebetween containing a reaction catalyst, said inner wall also defining a cylindrical conduit coaxial with said annular reaction chamber, said reaction chamber having an inlet end and an outlet end, said outlet end being disposed in said first portion;
    wall means spaced from said outer wall of said reaction chamber surrounding said second portion of said reactor defining a narrow annular burner gas passageway therebetween extending coaxially with and adjacent said reaction chamber and in heat exchange relationship thereto, said passageway having an inlet end in gas communication with said burner cavity and an outlet end substantially adjacent said inlet end of said reaction chamber;
    means for directing hot gases in the burner cavity into said burner gas passageway inlet end and through said burner gas passageway countercurrent to flow through said reaction chamber; and
    cylindrical plug means disposed within said cylindrical conduit and having an outer wall surface spaced inwardly from said inner wall of said reactor defining a narrow annular heat regeneration chamber therebetween coaxial with and adjacent said annular reaction chamber and in heat exchange relationship thereto, said annular regeneration chamber having an inlet end and an outlet end, said reactor including means for directing reaction products from said reaction chamber outlet end into said regeneration chamber inlet end and through said regeneration chamber countercurrent to the flow in said reaction chamber, said regeneration chamber being substantially isolated from heat in the burner cavity and burner gas passageway, wherein the spacing between the walls of the regeneration chamber is between 0.1 and 1.0 inch, the spacing between the walls of the burner gas passageway is between 0.1 and 3.0 inches, and the spacing between the walls of the reaction chamber is between 0.3 and 2.0 inches.

2. The catalytic reaction apparatus according to claim 1 wherein said reaction chamber contains a steam reforming catalyst and said catalyst reaction apparatus includes means for introducing a reformable hydrocarbon fuel and steam into said reaction chamber inlet end and means for introducing fuel and an oxidant into said burner cavity.

3. The catalytic reaction apparatus according to claim 1 wherein said burner gas passageway is substantially filled with a heat transfer packing material.

4. The catalytic reaction apparatus according to claim 3 wherein the spacing between the walls of the regeneration chamber is between 0.125 and 0.5 inch, the spacing between the walls of the burner gas passageway is between 0.5 and 2.0 inches, and the spacing between the walls of the reaction chamber is between 0.5 and 1.5 inches.

5. The catalytic reaction apparatus according to claim 1 wherein said reactors are vertically disposed within said furnace and said outlet end of said reaction chamber is at the upper end of said reaction chamber.

6. Catalytic reaction apparatus comprising:
    a furnace including means defining a burner cavity for burning fuel therein to produce hot gases;
    a plurality of closely packed tubular reactors disposed within said furnace, each including inner and outer wall means defining an annular reaction chamber therebetween containing reaction catalyst, said inner wall means also defining a cylindrical conduit coaxial with said annular reaction chamber, each of said reaction chambers comprising a first portion and a second portion and an inlet end and an outlet end, said first portion including said outlet end and being disposed within said burner cavity, said second portion being disposed outside said burner cavity, each reaction chamber having cylindrical plug means disposed within said cylindrical conduit and having an outer wall surface spaced inwardly from said inner wall means defining a narrow annular heat regeneration chamber coaxial with, adjacent to, and spaced inwardly from said reaction chamber and in heat exchange relationship thereto, said regeneration chamber having an inlet end and an outlet end, each of said reactors including means for directing reaction products from said reaction chamber outlet end into said regeneration chamber inlet end and through said regeneration chamber countercurrent to the flow in said reaction chamber, said regeneration chamber being substantially isolated from the heat of the hot furnace gases; and
    said second portion of each of said reaction chambers having wall means associated therewith and outwardly spaced therefrom to define a narrow annular burner gas passageway coaxial and in heat exchange relationship therewith and adjacent thereto over the length of said second portion, said passageway having an inlet end in gas communication with said burner cavity and an outlet end, said furnace including means for directing substantially all of the hot gases in the burner cavity into said inlet ends of said burner gas passageways and through said burner gas passageways countercurrent to the flow through said reaction chamber.

7. The catalytic reaction apparatus according to claim 6 wherein said regeneration chamber extends substantially the full length of said reaction chamber.

8. The catalytic reaction apparatus according to claim 6 wherein said burner gas passageway is substantially filled with a heat transfer packing material.

9. The catalytic reaction apparatus according to claim 6 wherein said annular reaction chamber is filled with a steam reforming catalyst, and said apparatus includes means for introducing a hydrocarbon fuel and steam into said inlet end of said reaction chamber.

10. The catalytic reaction apparatus according to claim 6 wherein the spacing between the walls of the regeneration chamber is between 0.1 and 1.0 inch, the spacing between the walls of the burner gas passageway is between 0.1 and 3.0 inches, and the spacing between the walls of the reaction chamber is between 0.3 and 2.0 inches.

11. The catalytic reaction apparatus according to claim 6 wherein the spacing between the walls of the regeneration chamber is between 0.125 and 0.5 inch, the spacing between the walls of the burner gas passageway is between 0.25 and 2.0 inches, and the spacing between the walls of the reaction chamber is between 0.5 and 1.5 inches.

12. The catalytic reaction apparatus according to claim 11 wherein said burner gas passageway is substantially filled with a heat transfer packing material, and the spacing between the walls of the burner gas passageway is between 0.5 and 2.0 inches.

13. The catalytic reaction apparatus according to claim 1 including a plurality of said tubular reactors, said tubular reactors being closely packed within said burner cavity, and wherein said means for directing hot gases in the burner cavity into said burner gas passageway inlet end comprises directing substantially all of the hot gases in the burner cavity into said inlet ends of said burner gas passageways of said plurality of reactors and through said passageways.

* * * * *